UNITED STATES PATENT OFFICE 2,067,205

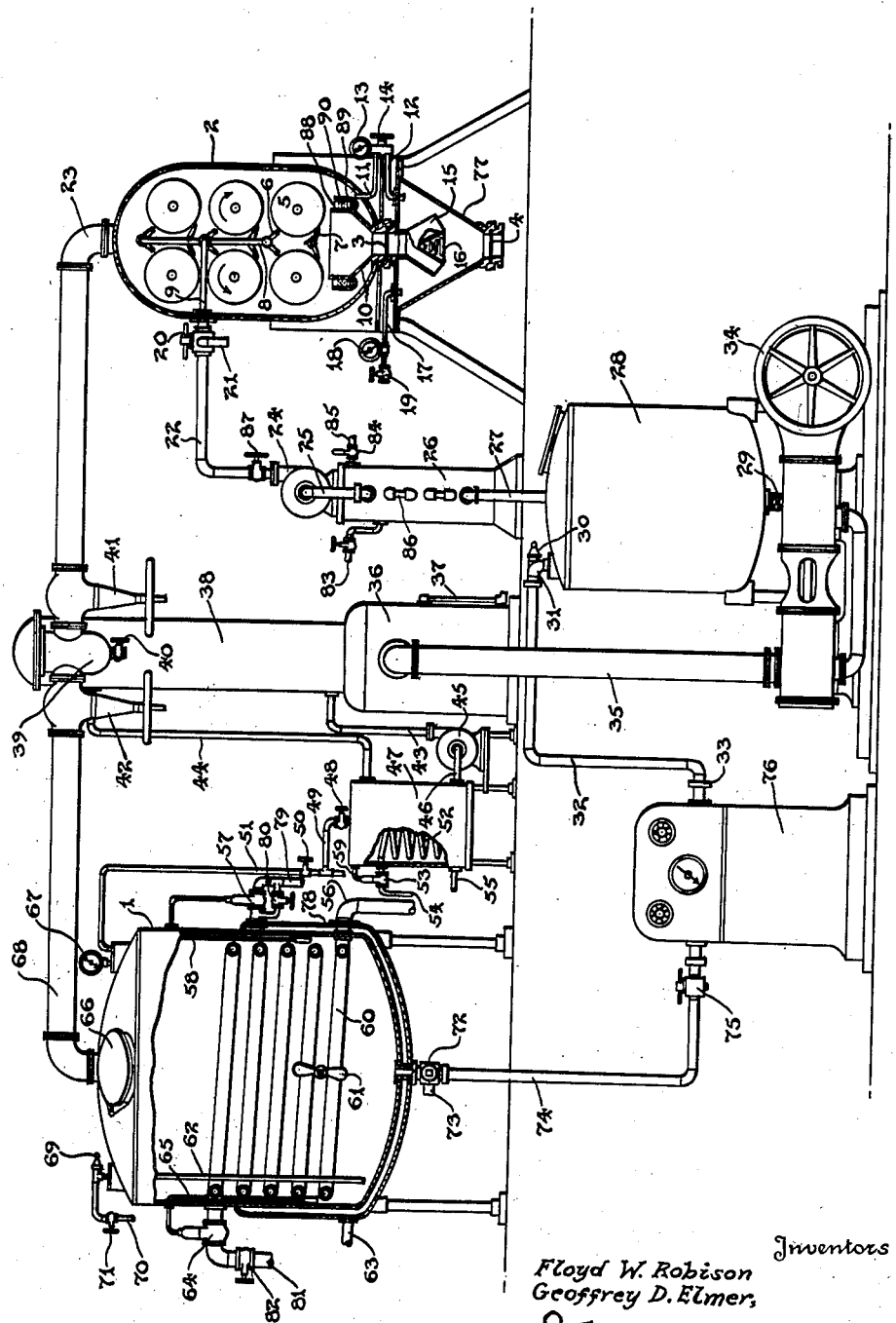

PROCESS OF DESICCATING LIQUIDS

Floyd W. Robison and Geoffrey D. Elmer, Detroit, Mich.

Application December 16, 1935, Serial No. 54,767

6 Claims. (Cl. 99—200)

The present invention relates to method and means for the desiccation of liquids, primarily liquid foods, and, as herein described, more particularly for the desiccation of cream and whole milk, as well as skim milk.

It is well known that there are many existing desiccating methods, and means for carrying them out, and it is equally well known that none of these processes as applied to certain food products, particularly milk, skim milk, or cream, are capable of desiccating said products without attendant deleterious effect on flavor, odor, and degree of freshness, when reconstituted, as compared to the product prior to desiccation.

We have found that in desiccating products such as whole milk, skim milk or cream, the following factors govern solubility, taste, odor, and absence of rancidity, in the dessicated product, namely, temperature to which the product is submitted during desiccation, moisture content after desiccation, contact with free oxygen during and after desiccation, acidity of the product prior to dessication, and the stableness of dispersion of the fat content; and that these factors are concomitant with freshness and the ability to so sustain, unimpaired, these products.

We have found that certain food products, having an appreciable fat content, such as whole milk or cream, if subjected to temperatures in excess of approximately 145° F., in process of desiccation, attain a condition of proteid coagulation sufficient to destroy full colloidal activity of said proteids, thereby exposing the fat globules to contact with free oxygen and bacterial activity, and thus promoting the development of rancidity in the product.

We have found that food products, such as whole milk, skim milk and cream, desiccated in accordance with current practice, contain a sufficient percentage of moisture to allow material bacterial migration and development; and that said migration and development produces undesirably rapid degeneration of the product.

We have also found that the occlusion of free oxygen, by such products, during desiccation, and prior to the time these products are reconstituted, results in progressive oxidation; and that said oxidation, in combination with progressive bacterial migration and development, promotes rapid rancidity of the product.

We have found that milk or cream or skim milk, as marketed, with normal acidity approximately 0.15%, will, upon complete desiccation, increase in acidity sufficiently to affect chemically the proteids therein, resulting in coagulation and partial granulation of the solids, thereby preventing ready and complete solubility. Although neutralization of milk as such is well known, in the instance we propose its application to this product prior to desiccation, for the purpose of effectuating complete solubility of the desiccated product, and in such practice we find it desirable to reduce the acidity of whole milk, skim milk or cream to a point just on the plus side of neutrality, or approximately .01% to .02%, to phenolphthalein.

We have also found that the natural colloidal activity of proteids, in whole milk and certain other foods, is amplified by homogenization, thus distributing the fat content more uniformly with solids-not-fat, and thereby effectuating a greater stability of the fat content.

We have found that the fat content of whole milk and cream, when desiccated, can be further protected from contact with free oxygen by subjecting the desiccated product to an abrupt reduction in temperature, immediately after the product leaves drying surface at a temperature of not over 145° F., by bringing said product in contact with a chilled surface, having a temperature of approximately −10° F., thereby crystallizing the semi-liquid fat content, thus preventing mobility of said fat globules through the solids-not-fat, and maintaining the protective colloidal properties of the surrounding proteids.

It is therefore obvious that the desiccation of such products as whole milk, skim milk or cream must in the first place be accomplished at temperatures sufficiently low to avoid destruction of colloidal activity of proteids. Otherwise, the natural protective function of the proteids is destroyed and the fat content is left to rapid oxidation, although the temperatures must be high enough to reduce rapidly the moisture content in order to thereby rapidly check and thereafter effectively limit bacterial migration. In the second place, the product when desiccated should have an acid content such that when reconstituted its acid content will not be greater than that of the fresh product of good quality, in order to thus safely avoid the possibility of chemical coagulation and granulation through increase of the normal acid content of the fresh product during desiccation. In the third place, a no less important consideration lies in preventing contact of free oxygen with the fat in the product during desiccation, since free oxygen definitely contributes to rapid promotion of rancidity. Finally, the desiccated product must and should, for its lengthy preservation, be such as to repel to an appreciable extent the effect of free oxygen and moisture.

In the accompanying drawing, the single figure of which is more or less diagrammatic, we have shown apparatus utilized in carrying out the process as hereinafter described.

In the necessary preparation of the apparatus for use, it is first desirable to exclude free oxygen from the several parts of the equipment, and sterilize such equipment by introducing approximately fifty gallons of water in tank 1, through water supply line 51 and then admitting steam to jacket 78, by opening valve 80 in steam supply line 79, thus heating said water in tank until it is in an active state of ebullition. Valve 72 at the bottom of tank 1 is then opened, directing a flow of boiling water from the tank 1 through pipe line 74 and valve 75, into homogenizer 76. With the homogenizer working, the boiling water passes from the same through pipe line 32 into balance tank 28 and from the bottom of this tank 28 through valve 29 and pipe line 27, into preheater 26. A centrifugal pump 24 draws water from the balance tank 28 and forces same through pipe line 22, and out of drain 21, through the two-way valve 20. Thus the flow of water is insured by the pumping action of homogenizer 76 and the centrifugal pump 24.

When all of the boiling water has passed through the above train of apparatus, valve 72 at the base of processing tank 1 is closed and valve 75 is closed, so that homogenizer 76 is shut off and steam supply valve 80 is closed. Valve 20 is also closed, cutting off the drain 21 and the vapor will condense and partial vacuum will ensue throughout this part of the apparatus train. The apparatus may then be said to be substantially sterile and non-free oxygenous.

The product to be treated, for example, whole milk, skim milk or cream, is fed into tank 1 through manhole 66 and is heated to a temperature of approximately 100° F. by means of the steam jacket 78, steam to which is now controlled by automatic valve 57. When temperature has been attained, vacuum pump 34 is started, valve 42 in vapor line 68 is opened, and the contents of tank 1 subjected to a sub-barometric pressure of approximately 29 inches, which will cause the product to attain a state of active ebullition, and this state is maintained for a period of time sufficient to deposit one gallon of condensate in receiver 36. At this time, valve 42 is closed and vacuum pump 34 is stopped, tank 1 and its contents being now non-free oxygenous. Gas valve 71 in gas line 70 is opened and sufficient inert and non-free oxygenous gas admitted to tank 1 to restore atmospheric pressure, and place the contents of tank 1 under two pounds gas pressure, as indicated by vacuum pressure gauge 67. The impeller 61 is then started and agitation of the contents of tank 1 is maintained for a period of approximately fifteen minutes to thoroughly impregnate the contents with the gas.

Brine valve 82, in brine supply line 81, is then opened and by reason of the supply of brine to a cooling coil 60 within tank 1, the contents of the tank are reduced to a temperature of approximately 38° F., and so maintained by the action of thermostatic valve 64 having in tank 1 a sensitive element 65.

Thus, by submitting the product to a sub-barometric pressure of 29+ inches, coincident with a temperature of approximately 100° F., thereby causing active ebullition of said product, driving off free oxygen by vaporization, a condition of great avidity for some satisfying gas factor is established in the product, and by admitting an inert, non-oxidizing gas, the satisfying factor is supplied, and then by cooling the product, a non-oxidizing gas lock is effected in a substantially thorough and complete manner.

The desiccating and flaking apparatus 2 is next prepared for use by closing the switches in the line supplying the electrical energy to heating elements in the tubular rolls 5, and by regulating the current supply to said elements so that said rolls will attain a temperature of approximately 145° F. The upper product outlet valve 3 is opened, and the lower product outlet valve 4 of the chamber 77 is closed, the receivers 90 being filled with water 88. The circuit to heating element 89 is closed, the upper compartment containing the rolls 5 is closed, and the circulating brine supply to a cooling coil 16 in chamber 77 is opened and maintained at sufficient circulation to bring the divided cooling member 15 to a temperature of —10° F.

Vacuum pump 34 is then again started and valve 41 in vapor line 23 is opened, so as to establish a sub-barometric pressure of 29+ inches in the upper roll compartment of the flaking apparatus and also in the lower outlet chamber 77. The water 88, in receivers 90, being heated to approximately 150° F. by electrical elements 89, rapidly vaporizes in the presence of the established vacuum, and in so doing entrains any free oxygen in the flaking apparatus for ready removal through the vapor line 23.

The condenser 38 is cooled by ice water from a tank 47, circulated by centrifugal pump 45, and maintained at the desired temperature by brine coil 52 in said tank.

Resuming the process, homogenizer 76 is started, steam is admitted to preheater 26, through valve 84 and steam line 85, and the water surrounding coils 86, through which the liquid under process passes, is raised to a temperature of approximately 145° F. Valve 72 at the bottom of tank 1 is opened to pipe line 74 and valve 75 in pipe line 74 is opened sufficiently to admit the liquid under process from tank 1 to homogenizer 76 in a volume proportioned to the consumption of said product by the flaking apparatus 2. The pumping action of homogenizer 76 forces the product through line 32 into tank 28, which serves as a reservoir for the product in the event of any interruption of the succeeding operations. The liquid under process is withdrawn from tank 28 by the action of centrifugal pump 24 through valve 29 and pipe line 27 into preheater 26, where the said product attains a temperature of approximately 145° F. through the medium of the preheated water surrounding the coils 86. Centrifugal pump 24 also moves the liquid under process from the preheater at a predetermined rate, established by valve 87, through line 22 and two-way valve 20 to the feeder 9, manifold 8, and jets 6 within the flaking apparatus 2.

The jets 6 lie parallel and close to the tubular, heated rolls 5, which rotate, as indicated, in opposite directions. The construction of the jets 6 is such that the liquid under process is applied to the rolls in a very fine spray. This results from effect of the sub-barometric pressure within the chamber which draws out the spray and the pumping action of the centrifugal pump 24 which simply maintains a proper head of fluid in the jet supply pipes.

The liquid under process, in passing through homogenizer 76, is subjected to a high velocity impact, breaking up the solids and distributing them uniformly, so that no particle thereof exceeds 1½ to 2 microns in size, thereby enhancing the natural colloidal properties of the solids-not-fat, and obtaining a more uniform dispersion of the fat content through the non-fatty solid. The liquid leaves tank 1 at a temperature of approximately 38° F. The preheater 26 is introduced in the apparatus train, between the reservoir 28 and the desiccating apparatus 2, for the purpose of raising the temperature of said product from 38° F. to 145° F., in order to insure maximum vaporization of the moisture content of said product, as it is emitted from the jets 6, in the presence of a sub-barometric pressure of approximately 29+ inches. The centrifugal pump 24 insures a constant and uniform supply of the liquid to the regulatory valve 87, the purpose of which is to regulate the flow of the liquid in sufficient quantity, and at uniform velocity, through the connecting pipe lines 22, 9 and manifold 8, so that the sub-barometric pressure within the apparatus 2 may draw the liquid from the jets 6 at high velocity and in the form of a finely divided spray by reason of the expansive force of the gas accompanying the liquid. In this form, the moisture content readily vaporizes at a temperature of approximately 145° F. and a sub-barometric pressure of 29+ inches. This method provides rapid vaporization at a temperature sufficiently low to avoid any harmful effect, materially reduces by vaporization the moisture content of the liquid prior to establishing and maintaining contact with the heated rolls 5, and enables the flow of the liquid to be so regulated that the resultant spray deposits just sufficient liquid on the rolls 5, so that the period of time required to rotate said rolls somewhat less than a full rotation is sufficient to complete the desiccation of the liquid as it is removed from the rolls by the knives 7.

The inert, non-oxidizing gas previously locked in the liquid at the processing tank 1 is released therefrom to some degree, first, as the liquid is heated in the preheater 26 and, second, as it is desiccated in the apparatus 2. The temperature to which the product is submitted in both of the above instances and the period of time this temperature is maintained has resulted, under the conditions attained, in promoting once more a condition of great avidity for a gas satisfying factor, which is satisfied, as will be shown later on, by the introduction of carbon dioxide gas, or other inert gas, through pipe 17 by opening valve 19 immediately before removal of the desiccated product from chamber 17.

It will be understood from the foregoing that there is a partial drying of the liquid in vaporizing the same from the spray nozzles 6 and that the material collected on the rolls 5 has a moisture content sufficiently low to permit of its collection on said rolls, the heat of which during but a partial revolution thereof is sufficient to thoroughly dry the product and by this is meant the material has a final moisture content of but one-half to one per cent as against the usual moisture content of desiccated products varying from three to six per cent.

The above results in part from the two-stage drying operation and more especially to the fact that as the partially dried material collects upon the surface of the rolls 5, the gas carried thereby and still expanding forms a myriad of bubbles which almost immediately break and thus present to drying action constantly changing surfaces whereby to enhance rapid and practically complete withdrawal of moisture in completing the already partial drying of the product.

During the above desiccating operation, the lower chamber 17 is subjected to the sub-barometric pressure existing in the upper roll chamber by reason of the fact that the valve 3 between these chambers is open for the fall of the dry material through the restricted passage in which valve 3 is located. The falling material then comes into contact with the cold plate or member 15 and is there rapidly reduced in temperature to approximately −10° F., so that this sudden, sharp reduction in temperature will cause crystallization of the semi-solid fat content to thus establish the minute fat globules in an immobile state throughout the solids-not-fat. In this way the protective colloidal qualities of the proteids are preserved to the extent that the dry product is protected against all ordinary moisture with which the product may be subsequently subjected by reason of its contact with ordinary atmosphere or dry materials having only a small percentage of moisture, while at the same time detracting in no substantial manner from its ready solubility in the presence of moisture in the quantity required for reconstitution of the product in the form prior to its desiccation.

The chilled product is collected in chamber 17 until it is to be removed, and thereupon the upper valve is closed and pressure raised in chamber 17 by introducing carbon dioxide gas through pipe 17 by opening valve 19. A pressure gauge 18 governs the amount of gas so introduced whereby when the lower valve 4 is opened and the product dumped therethrough, the gas filling chamber 17 prevents the entrance of air and moisture.

After dumping the contents of chamber 17, and equalizing pressure through a bleeding arrangement including parts 11, 12, 13 and 14, valve 4 is closed and upon opening upper valve 3, the parts are ready for further operation.

What is claimed is:

1. The process of desiccating fatty liquids deteriorating in temperatures in excess of 145° F., which consists in heating the liquid to approximately 100° F. in the presence of a sub-barometric pressure of 29+ inches to cause active ebullition and withdraw all free oxygen from the liquid while at the same time creating in the liquid a condition of great avidity for a satisfying gas factor, supplying an inert, non-oxidizing gas to satisfy such avidity and relieve pressure on the liquid, agitating the liquid to thoroughly impregnate the liquid with the gas, reducing the temperature of the liquid to establish a gas lock, subsequently reheating the gas laden liquid to approximately 145° F. for expanding the same and immediately thereafter drying the liquid at approximately such temperature while still expanding, and finally locking inert gas in the dried material.

2. The process of desiccating cream, whole milk and fatty liquids deteriorating in temperatures in excesse of 145° F. which consists in heating the same to approximately 100° F. in the presence of a sub-barometric pressure of 29+ inches to cause active ebullition and withdraw all free oxygen from the material whereby to create in the liquid a condition of great avidity for a satisfying gas factor, supplying an inert, non-oxidizing gas to satisfy such avidity and relieve pressure on the liquid, agitating the liquid to thoroughly impregnate the liquid with the gas, reducing the temperature of the liquid to establish a gas lock, subsequently reheating the gas laden liquid to approximately 145° F. and immediately thereafter drying the same at approximately such temperature with but partial loss of the gas, and finally subjecting the dried material to a sharp sudden reduction in temperature to lock the remaining inert gas therein.

3. The process of desiccating whole milk and cream and other fatty liquids deteriorating in temperatures in excess of 145° F. which consists in first heating the liquid to a temperature of 100° F. and subjecting the same to a sub-barometric pressure for causing ebullition of the liquid without cooking the same and withdrawing all free oxygen therefrom to create a condition of great avidity therein for a satisfying gas factor, satisfying such avidity by introducing and impregnating the liquid with an inert, non-oxidizing gas and thereby relieving the pressure thereon, chilling the liquid to thereby lock the gas therein, subjecting the gas laden liquid to a homogenizer operation to reduce and distribute the fat and non-fat solids, reheating the liquid to a temperature not exceeding 145° to cause expansion of the liquid and gas, drying the material at a temperature not exceeding that to which it is preheated and while the material is still expanding, and finally subjecting the dried material to a sudden reduction in temperature sufficient to crystallize and immobilize the fat content thereof and at the same time lock non-oxidizing gas therein.

4. The process of desiccating fatty liquids deteriorating in temperatures in excess of 145°, including cream and whole milk which consists in utilizing such liquids in a non-free oxygenous, gas laden condition, preheating the liquids to a temperature not exceeding 145° F. for causing sufficient expansion of the liquid and gas to bring about immediate vaporization upon release as a spray in a sub-barometric pressure of 29+ inches, spraying the preheated liquid in, and by reason of, such sub-barometric pressure so that upon immediate vaporization it undergoes partial drying, collecting the partially dried material, while still subject to the sub-barometric pressure, upon a drying surface heated to a temperature not exceeding 145° F. and at the same time above the vaporization point in the sub-barometric pressure, whereby to complete the drying operation by the combined influence of low heat and high vacuum and locking the remaining gas in the dried material.

5. The process of desiccating fatty liquids deteriorating in temperatures exceeding 145° F. including cream and whole milk, which consists in utilizing such liquids in a non-free oxygenous, gas laden condition, preheating the liquids to a temperature not exceeding 145° F. for causing sufficient expansion of the liquid and gas to bring about immediate vaporization upon release as a spray in a sub-barometric pressure of 29+ inches, spraying the preheated liquid in, and by reason of, such sub-barometric pressure so that upon immediate vaporization it undergoes partial drying, collecting the partially dried material, while still subject to the sub-barometric pressure, upon a drying surface heated to a temperature not exceeding 145° F. and at the same time above the vaporization point in the sub-barometric pressure, whereby to complete the drying operation by the combined influence of low heat and high vacuum, transferring the dry product to a chilling area of maintained crystallizing temperature and into contact with a chilled crystallizing surface while subject to the same sub-barometric pressure, and finally, before removal of the product, cutting off the chilling area from the sub-barometric pressure and restoring atmospheric pressure therein by the introduction of a non-oxidizing gas.

6. The process of desiccating cream, milk and other fatty liquids deteriorating in temperatures in excess of 145° F., which consists in first withdrawing from the liquid all free oxygen, substituting an inert, non-oxidizing gas, heating the liquid to a temperature to cause expansion of the liquid and gas and not above 145°, drying the liquid substantially at the temperature to which it is heated in a sub-barometric pressure to cause vaporization thereof, collecting the dried material in a chilled area and crystallizing the fat content while still subject to the said pressure and in a condition of avidity for a satisfying gas factor, and finally supplying an inert, non-oxidizing gas to the chilled area to satisfy the avidity of the dry crystallized product therefor and at the same time restore atmospheric pressure.

FLOYD W. ROBISON.
GEOFFREY D. ELMER.